United States Patent [19]

Mayo

[11] E Re. 31,148

[45] Reissued Feb. 15, 1983

Best Available Copy

[54] SUB-SEA EQUIPMENT TEST AND ISOLATION TOOL

[76] Inventor: John H. Mayo, 404 Alonda Dr., Lafayette, La. 70503

[21] Appl. No.: 242,247

[22] Filed: Mar. 10, 1981

Related U.S. Patent Documents

Reissue of:

[64] Patent No.: 4,152,924
Issued: May 8, 1979
Appl. No.: 925,449
Filed: Jul. 17, 1978

[51] Int. Cl.[3] ..... G01M 3/28
[52] U.S. Cl. ..... 73/40.5 R; 73/49.1
[58] Field of Search ..... 73/40.5 R, 46, 49.1

[56] References Cited

U.S. PATENT DOCUMENTS

| | | | |
|---|---|---|---|
| 2,953,919 | 9/1960 | Potts | 73/49.1 X |
| 3,048,998 | 8/1962 | Gilreath | 73/49.1 X |
| 3,165,919 | 1/1965 | Loomis | 73/40.5 R |
| 3,165,920 | 1/1965 | Loomis | 73/40.5 R |
| 3,199,598 | 8/1965 | Loomis | 73/49.1 X |
| 3,420,095 | 1/1969 | Brown et al. | 73/40.5 R |
| 3,478,577 | 11/1969 | Hauk | 73/49.1 |
| 3,503,249 | 3/1970 | Dumond | 73/49.1 |
| 3,712,115 | 1/1973 | Miller | 73/49.1 |
| 3,787,226 | 1/1974 | Iglehart et al. | 73/49.1 X |
| 4,081,990 | 4/1978 | Chatagnier | 73/40.5 R |

FOREIGN PATENT DOCUMENTS

| | | | |
|---|---|---|---|
| 2443627 | 4/1976 | Fed. Rep. of Germany | 73/49.1 |

*Primary Examiner*—Kyle L. Howell
*Assistant Examiner*—Joseph W. Roskos
*Attorney, Agent, or Firm*—D. Paul Weaver

[57] ABSTRACT

A combined test and isolation tool for sub-sea well equipment is used particularly for testing the integrity of internal sealing surfaces of sub-sea well head housings and also for testing casing hangers and their seals. The same tool is run on drill pipe in a sub-sea well to isolate a casing hanger seal from components of the well blow-out preventer to determine accurately and with finality where a detected leak originates. The use of the tool enables costly well head housings, casing hangers and seals normally discarded following a single usage to be reused with safety and efficiency and at a great savings in cost.

21 Claims, 8 Drawing Figures

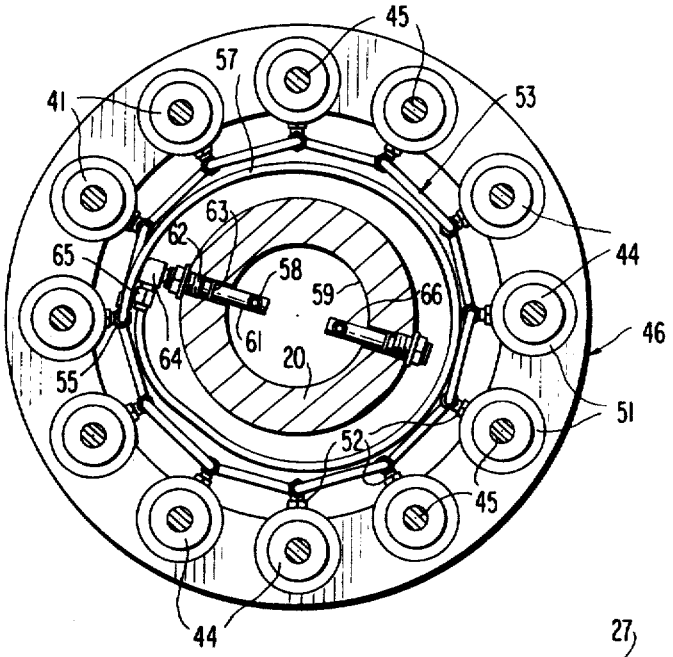
FIG. 3
FIG. 5
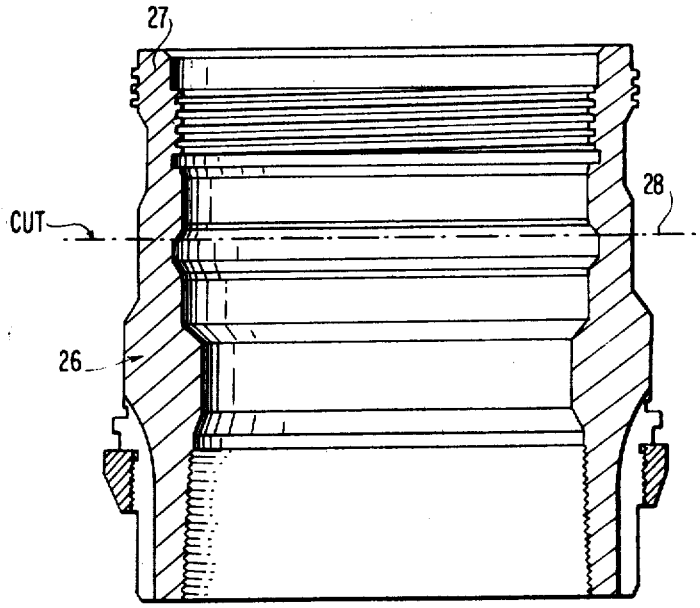
FIG. 4
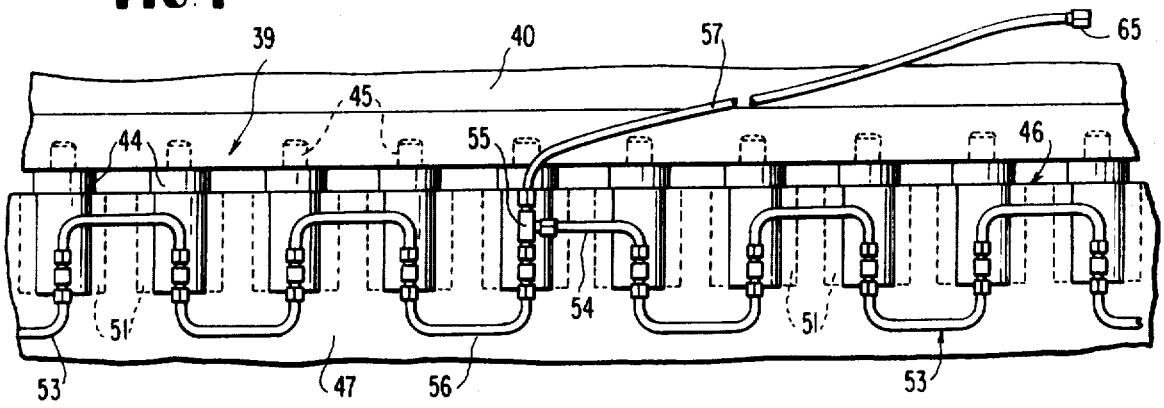

SUB-SEA EQUIPMENT TEST AND ISOLATION TOOL

Matter enclosed in heavy brackets [ ] appears in the original patent but forms no part of this reissue specification; matter printed in italics indicates the additions made by reissue.

BACKGROUND OF THE INVENTION

The proliferation of sub-sea well drilling operations and the heavy cost incident thereto has created an urgent need for economy in many areas. For example, it has been customary to discard some costly equipment components after a single usage without any effort to salvage and reuse the same. Costly new components are sold to the customer for each new sub-sea drilling operation. Among the components which have been discarded after use are well head housings in which costly casing hangers and their seals are disposed. Each casing hanger seal when new costs as much as $3,000 and the new well head housing costs many thousands of dollars and when used only once represents an extreme economic burden on the customer.

This invention has been devised to deal with the above problem completely and economically so that the costly practice of discarding well head housings after only one usage can be eliminated. More particularly, the tool which embodies the present invention has the ability to efficiently test the internal sealing surfaces of well head housings to determine the integrity of such surfaces after usage in a sub-sea well, and in almost all cases, the testing indicates that the well head housing can be safely reused a number of additional times with a correspondingly great saving of money. Additionally, the tool according to the invention is used to test sub-sea casing hangers and their costly seals. By means of the identical tool, when run on a drill pipe string in a well and actuated with fluid pressure through the drill pipe, a given casing hanger seal can be isolated from blow-out preventer equipment to determine whether the seal is leaking, in which case the seal is replaced, or whether the source of the trouble is somewhere in the blow-out preventer.

Another very important aspect of the invention resides in the fact that the test and isolation tool itself is quite simple and comparatively economical in construction because of the fact that the tool employs discarded and slightly altered casing hangers and used casing hanger seals instead of new seals which cost up to $3,000, as stated. Each time a well is drilled at least one seal is used and usually two and these seals are discarded. The discarded casing hanger seals are the seals employed for the tool forming the subject matter of the invention. When the casing hangers are repaired, new seals are always used, and for the sealing surfaces of the hangers to have been tested with used seals and found to be satisfactory puts even a greater guarantee on the integrity of the surfaces, and this guarantee applies equally to the sealing surfaces of well head housings which are also tested by used seals on the test tool. The tool is also capable of testing casing hanger seals simultaneously with the testing of sealing surfaces on well head housings and casing hangers. Thus, the invention is very versatile resulting in a further savings of cost to the customer.

The prior art contains a variety of testing tools for well pipe and well head equipment and for well casing.

The nature and construction of such tools varies widely depending upon the particular use or application of the test tool. Many prior art test tools are for the purpose of testing a full length of pipe or casing for leakage through pin holes, threads or couplings and not at specific local sealing surfaces, as is the case with the present invention. Suffice it to say, no known prior art device is constructed and arranged to satisfy the specific requirements which the present test and isolation tool meets, and to this extent the present invention is thought to satisfy a need of the art which heretofore has not been satisfied by anyone.

To comply with the duty to disclose known prior art under 37 C.F.R. 1.56, the following United States patents are made of record herein:

U.S. Pat. Nos. 2,951,363; 3,034,339; 3,048,998; 3,177,703; 3,199,598; 3,371,521; 3,478,577 and 3,712,115.

Other features and advantages of the invention will become apparent during the course of the following detailed description.

BRIEF DESCRIPTION OF THE DRAWINGS

FIG. 3 is a horizontal section taken on line 3—3 of FIG. 2.

FIG. 4 is an enlarged fragmentary developed elevational view of tubing for supplying hydraulic pressure simultaneously to multiple cylinders of a hydraulic actuator and taken approximately on line 4—4 of FIG. 2.

FIG. 5 is a central vertical section taken through a used casing hanger which, after cutting, forms an element of the tool.

DETAILED DESCRIPTION

Figure 2:
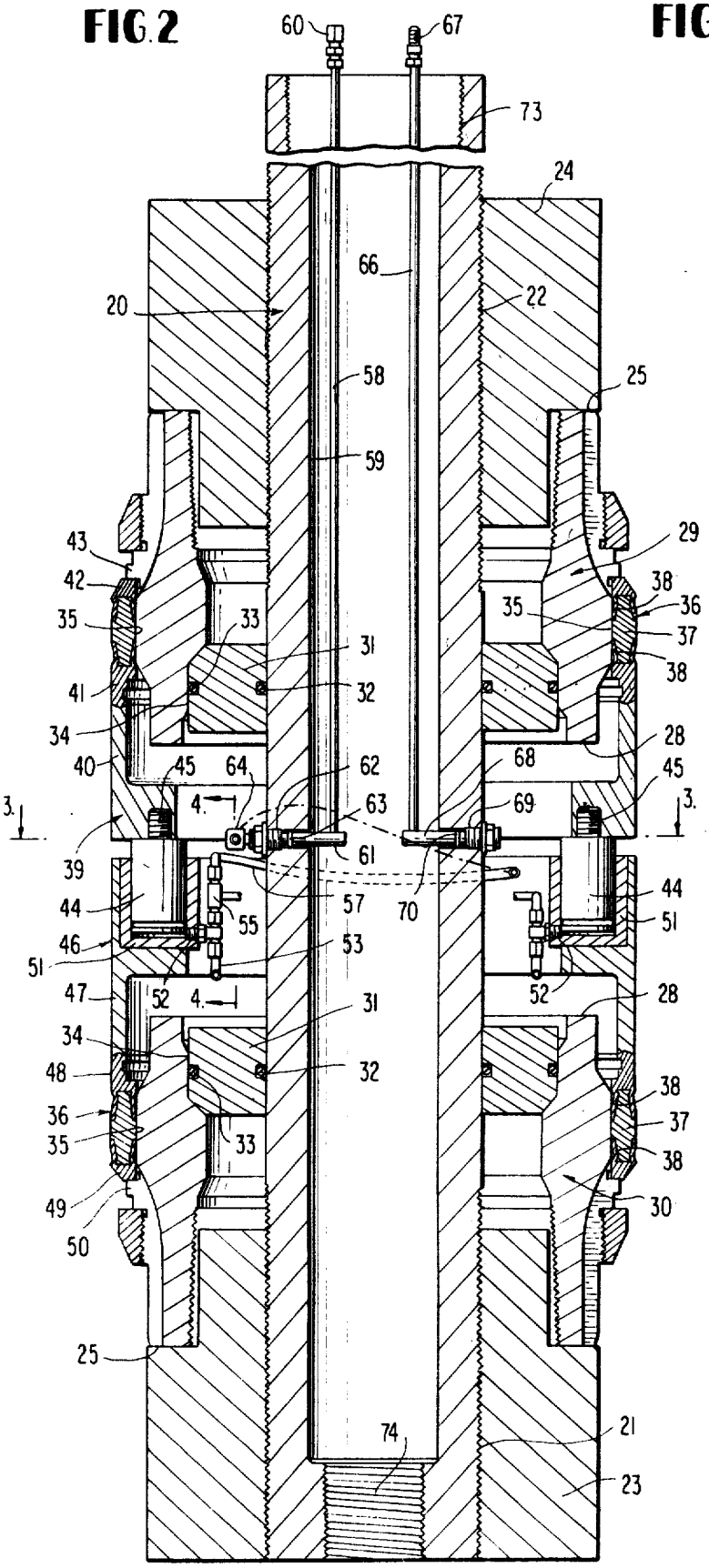
FIG. 2 is an enlarged central vertical longitudinal section through the tool.

Referring to the drawings in detail wherein like numerals designate like parts, the test and isolation tool proper comprises a tubular mandrel 20 having external screw-threads 21 and 22 on opposite end portions thereof to receive nuts 23 and 24 having annular shoulders 25. The tool utilizes a pair of used salvaged conventional casing hangers of the type shown at 26 in FIG. 5. Each such casing hanger has one end portion 27 thereof completely cut off on a transverse cutting line 28 to provide the modified casing hanger utilized in the test and isolation tool. Such modified casing hangers are shown at 29 and 30 in the drawings and, referring to FIG. 2, it will be noted that the elements 29 have their cut-off end faces 28 disposed in end-to-end opposing coaxial spaced relationship in the tool assembly.

The two modified casing hangers 29 and 30 are located radially of the mandrel 20 and are pressure sealed relative to the outer cylindrical surface of the mandrel by a pair of collars or rings 31 each having an interior O-ring seal 32 in sealing engagement with the mandrel 20 and an exterior O-ring seal 33 in similar sealing engagement with an interior cylindrical face 34 of each casing hanger 29 and 30.

Surrounding a cylindrical sealing land 35 on each casing hanger 29 and 30 is a conventional used and salvaged annular casing hanger seal 36. Each such seal has an elastic rubber-like body 37 tapering axially in both directions and being capped on each end of the elastic body 37 by thin lipped metallic seal elements 38 adapted to be forced into metal-to-metal fluid sealing engagement with the lands 35 when the elastic bodies 37 are compressed axially, in a manner to be described.

Means are provided on the tool assembly to activate or energize the two seals 36 and this means comprises a multiple piston carrier head 39 having an annular skirt 40 surrounding the inner end portion of the casing hanger 29 with the end of the skirt bearing on a rigid annulus 41 of one seal 36, such seal having an opposite end rigid annulus 42 engaging a rigid shoulder 43 of casing hanger 29. The multiple piston carrier head 39 has preferably twelve comparatively small equal diameter and circumferentially equidistantly spaced pistons 44 anchored thereto through threaded stems 45 on the pistons. The twelve small pistons 44 extend axially of the head 39 in surrounding relationship to the mandrel 20, as illustrated. The pistons 44 are all of equal length axially.

Mounted in opposing spaced relationship to the piston carrier head 39 is a cylindrical piston head 46 having an integral axially extending skirt 47 whose end bears against a rigid annulus 48 of the second seal 36, such seal having another rigid annulus 49 bearing against a rigid annular shoulder 50 of the modified casing hanger 30.

The cylinder head 46 contains preferably twelve circumferentially spaced cylinders 51 sized and spaced to receive the pistons 44 telescopically, for relative reciprocation. Pressurized fluid is delivered into the bottom of each small cylinder 51 below the adjacent piston 44 through a small fitting 52 on the interior of the cylinder having a connection with a serpentine fluid delivery tube 53 of very small diameter. One terminal end 54 of this tube receives pressurized fluid from a T-fitting 55 which is also coupled to the other terminal end portion 56 of the tube 53. Pressurizing fluid for the several cylinders 51 is delivered to the fitting 55 through a flex coil 57 which is looped around the mandrel 20 in the cavity between the two relatively movable heads 39 and 46. This flex coil allows the necessary relative movement between the heads 39 and 46 when the cylinders 51 are pressurized. Due to the arrangement of the tube 53 with fittings 52 and 55, all of the twelve cylinders 51 will receive pressurizing fluid simultaneously. Such action will spread apart the two heads 39 and 46 axially of the mandrel 20 and through the skirts 40 and 47, the elastic bodies 37 of the two seals 36 will be compressed and the thin metal sealing lips 38 of both seals will be activated or energized during use of the tool for testing or for isolation purposes, FIGS. 6 and 7, as will be further described.

Pressurized fluid to energize the cylinders 51 is delivered through a longitudinal tube 58 extending into the bore 59 of the tubular mandrel 20 and equipped outside of the mandrel with a suitable coupling 60 so that the tube 58 can be coupled with a source of pressurized fluid, not shown. Near the center of the mandrel and tool the tube 58 communicates with a radial fitting or adapter 61 having screw-threaded engagement at 62 in a screw-threaded opening formed in the side wall of mandrel 20. The adapter 61 is sealed effectively relative to the mandrel opening by an O-ring seal 63. The outer end of fitting 61 is coupled through an elbow fitting 64, FIG. 3, with the inlet end of the aforementioned flex coil 57 which has a coupling 65 thereon for this purpose.

A separate longitudinal tube 66 for seal testing fluid also extends through the mandrel bore 59 and has a coupling 67 at its end beyond the mandrel bore for connecting with a source of pressurized fluid. The other end of tube 66 is connected in the bore 59 with a second radial adapter 68, having threaded engagement as at 69 with the mandrel 20. The adapter 68 is sealed relative to the mandrel radial opening by an O-ring 70, as illustrated. Pressurized test fluid delivered to the adapter 68 from tube 66 following energizing of the two seals 36 is delivered to the space outside of the mandrel 20 and between the two seals 36 via the fitting or adapter 68, FIGS. 2 and 6.

Figure 1:
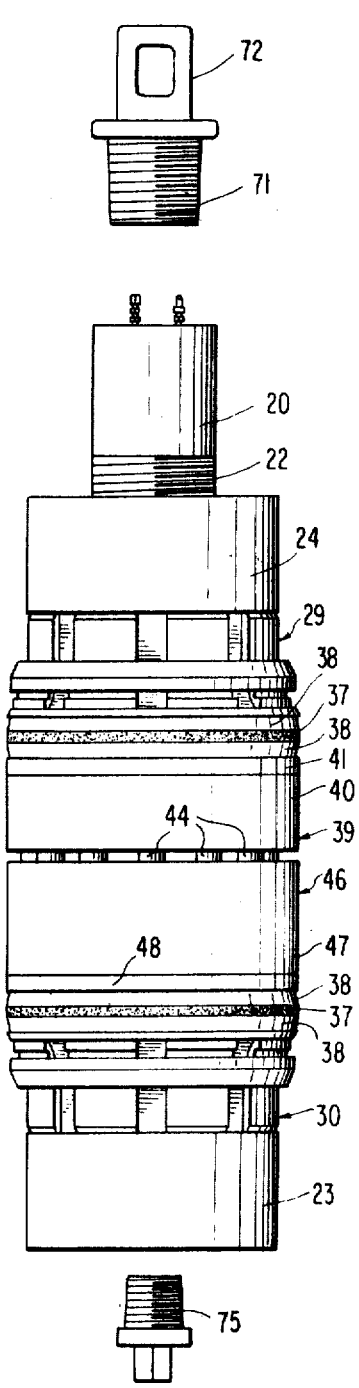
FIG. 1 is a composite side elevation of a test and isolation tool embodying the invention with associated handling and plugging elements.

Referring to FIGS. 1 and 2, a plug 71 having an integral loop 72 is adapted to enter internal screw-threads 73 provided in one end of the mandrel 20 merely for the purpose of lifting and manipulating the tool, which is quite heavy, with suitable equipment. The opposite end of the mandrel contains a threaded opening 74 of reduced diameter adapted to be closed by a plug 75 when the tool is used as an isolation tool, FIGS. 7 and 8.

Figure 6:
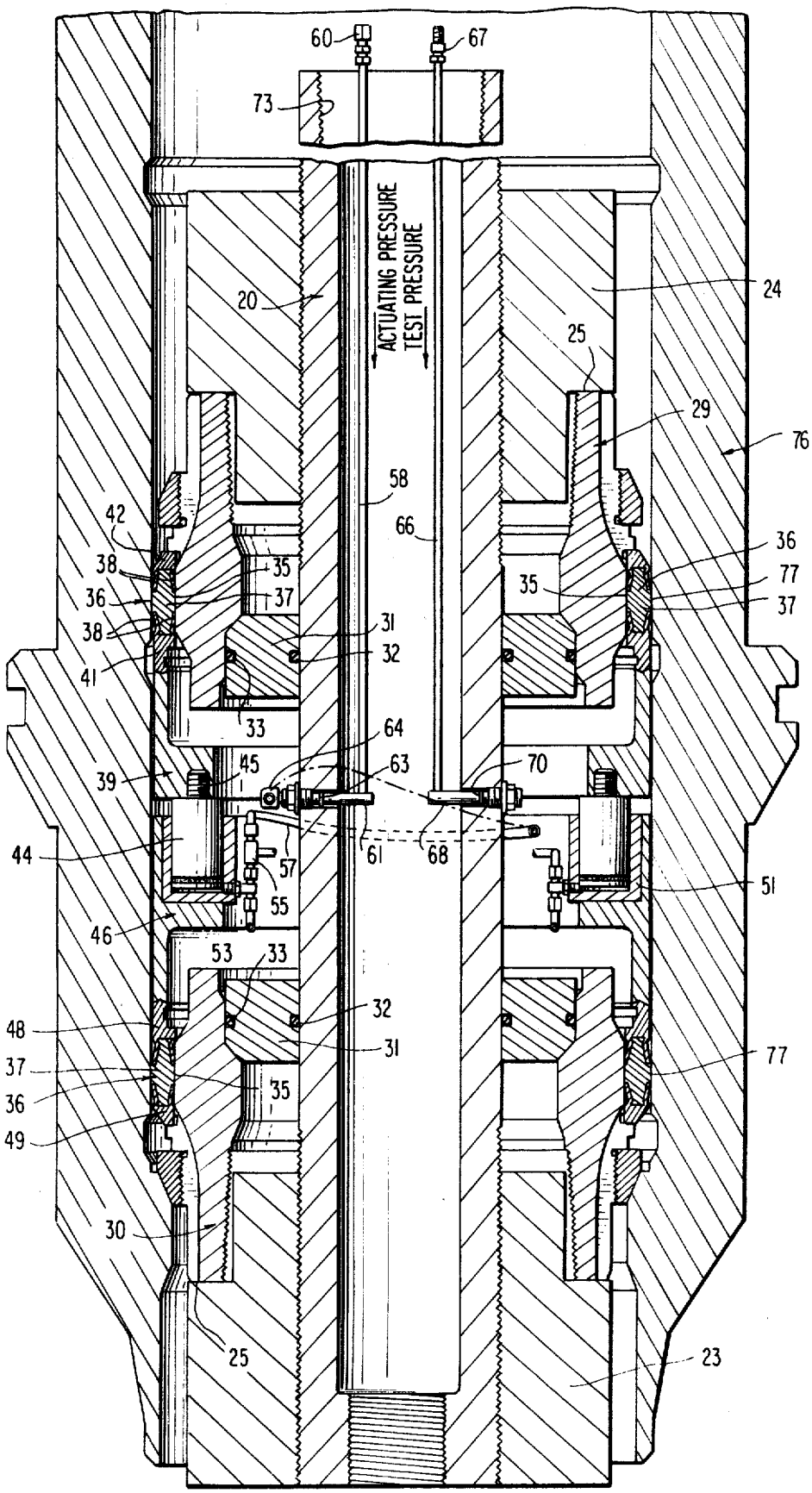
FIG. 6 is an enlarged central vertical section through the tool and through a used well head housing whose sealing surfaces are being tested.

For testing a retrieved well head housing 76, as shown in FIG. 6, to assure that its two localized internal sealing lands 77 are still secure and able to hold the required pressure so that the housing 76 can be safely reused, the following procedure is carried out. The assembled tool, as described in FIGS. 1 and 2, is placed in the bore of well head housing 76 undergoing testing of its sealing surfaces 77 and the two used casing hanger seals 36 of the tool are placed in registration with the annular sealing surfaces 77. Pressurized fluid is then sent through the small tube 58 and adapter 61 to the flex coil 57 and through this coil to the fitting 55 and tube or manifold 53 leading to the several cylinders 51. Since all of the tubing is small in diameter, there is no problem of it withstanding the high pressures involved. Preferably the seal energizing fluid delivered from the tube 58 is initially at a pressure of about 1500 psi which lightly expands the metal lips 38 of the two seals 36 against the lands 77 of well head housing 76 and the opposing lands 35 of casing hangers 29 and 30. Following this, pressurized fluid for testing the seals 36 is introduced through the tube 66 somewhat in excess of the pressure in the tube 58. This will produce leakage around the seals 36 and the desired bleeding of air from the space between the two seals. The pressure for energizing the seals via tube 58 and for testing via tube 66 is then incrementally increased until the test pressure through the tube 66 reaches about 10,000 psi. If the seals 36 hold this pressure, it is apparent that the sealing surfaces 77 of the well head housing are perfectly sound and the housing is reusable. In practice, the pressures may be stepped up from the initial 1500 psi to about 5000 psi and then to 7500 psi and, finally, to the full test pressure of 10,000 psi. The seal energizing and test pressures in the two tubes 58 and 66 can be equalized in practice within plus or minus 100–200 psi. The O-rings 32 and 33 of collars 31 assure no leakage around the collars and no leakage can occur around the adapters 61 and 68 because of the O-rings 63 and 70.

Since the seals 36 of the testing tool are normally used seals and if the test indicates that the sealing lands 77 are secure at the required test pressure, it is all the more clear that when the housing 76 is again used in a well with new casing hanger seals the lands or surfaces 77 will hold. If the housing 76 passes the test and can be used, a great savings is effected compared to the cost of a new well head housing, as will be known to any one skilled in the art.

Still referring to FIG. 6, it should be apparent that the test tool can simultaneously with the testing of the sealing surfaces 77 test new or used casing hanger seals. Also, the tool can be used to test a regular uncut or unaltered casing hanger of the type shown at 26 in FIG. 5, one hanger at a time merely by changing the configuration of the mandrel and nut from that configuration shown in FIG. 6.

Figure 7:
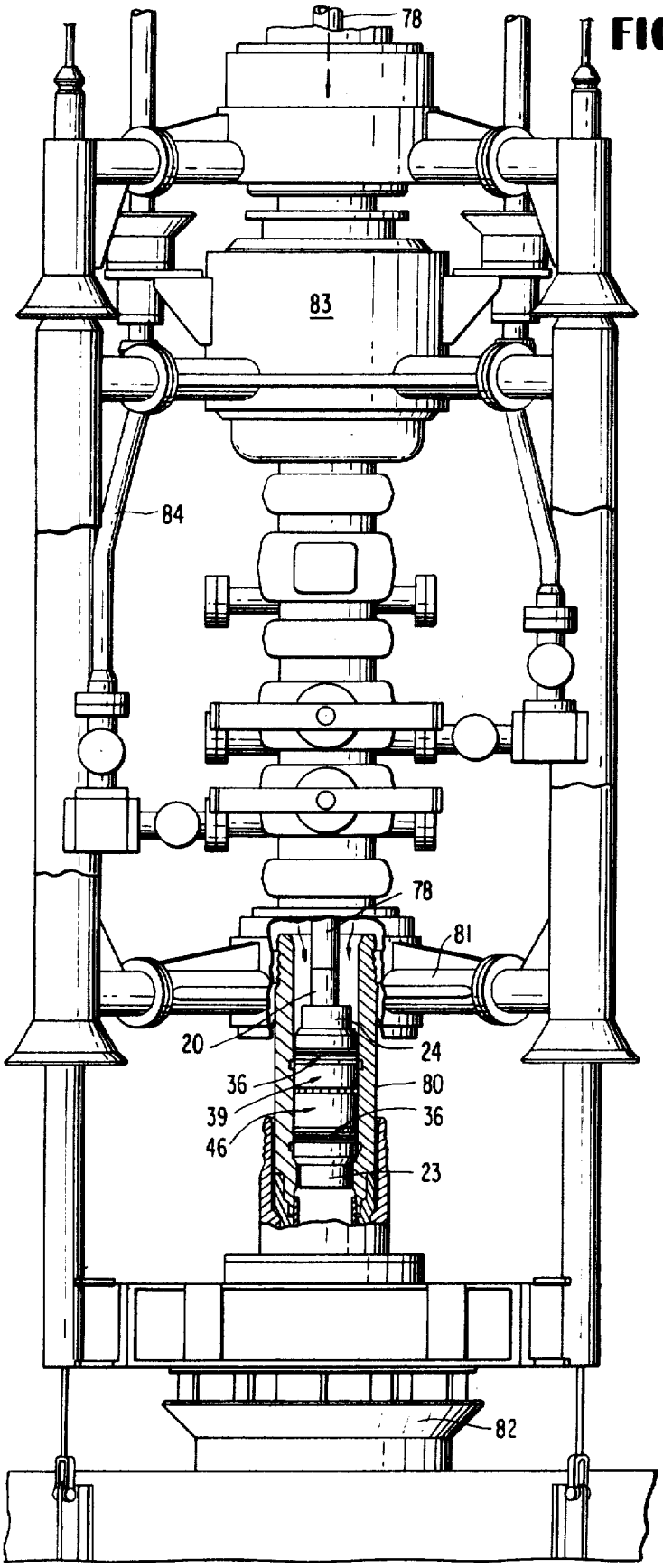
FIG. 7 is a side elevation, partly in cross section and partly broken away, showing a sub-sea well head and associated equipment with the tool according to the invention being employed as an isolation tool.
Figure 8:
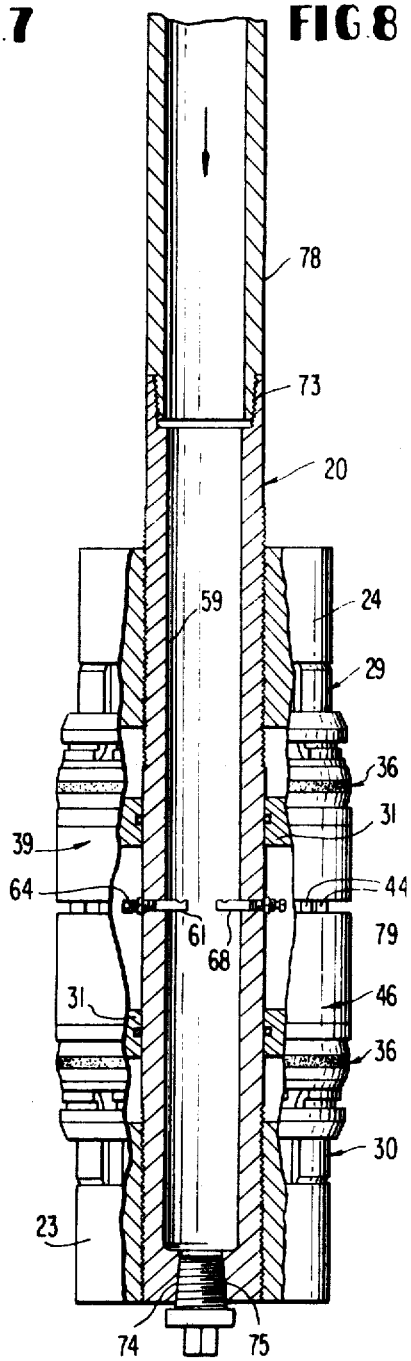
FIG. 8 is a side elevation, partly in cross section, of the isolation tool connected to drill pipe.

Referring to FIGS. 7 and 8, the use of the tool as an isolation tool is illustrated. For this purpose, the tool is connected directly in drill pipe 78, and the upper internal threads 73 of tubular mandrel 20 are coupled with mating threads on the lowermost pipe section 78. During the isolation test, the lower threaded opening 74 of the mandrel 20 is plugged by the element 75. The outlet of the test fluid adapter 68 is also closed or plugged by a plug element 79, FIG. 8. Neither of the tubes 58 and 66 is required for the isolation test and they are removed from the adapters 61 and 68. Fluid pressure for activating or energizing the seals 36 is obtained through the drill pipe 78 and the bore 59 of the mandrel and through the adapter 61, flex coil 57 and tube 53 connected to cylinders 51, as previously described in detail. Except as described above, the tool assembly remains exactly the same as previously described in FIGS. 1 through 6.

In FIG. 7, the isolation tool as shown in FIG. 8 is positioned within an in-place well head housing 80 in the same manner illustrated in FIG. 6 so that the two seals 36 of the tool engage the internal sealing lands 77 of the well head housing. The well head housing 80 is shown positioned normally relative to the lower BOP guide frame 81 and above the temporary guide base assembly 82 of the sub-sea well. FIG. 7 shows additional elements of the BOP equipment including a middle BOP guide frame 83 and choke and kill line 84. Other illustrated components are conventional.

As previously stated, during the isolation test, FIG. 7, the seals 36 of the test tool are energized by fluid pressure through the drill pipe 78, the bore of mandrel 20, adapter 61 and the described cylinder-piston arrangement, FIGS. 3 and 4. The results are the same as where the seals 36 are energized through the small tube 58 from an external source of fluid pressure for testing the well head housing lands 77.

In the isolation test, the test pressure which may be full well head pressure is delivered through the choke and kill line 84 directly into the open top of well head housing 80, FIG. 7. If the top seal 36 of the tool holds this test pressure without leaking, it is then clear that a detected leak is somewhere in the BOP equipment and not in the seal 36. On the other hand, if the top seal 36 does leak in the isolation test, it can be replaced.

It has now been shown that the versatile and comparatively simple tool has utility as an isolation tool as well as for testing localized internal sealing lands of expensive well head housings to enable their reuse and also for testing casing hangers and their seals. The advantages of the tool over prior art devices should now be apparent to those skilled in the art.

With final reference to FIG. 2, it can be pointed out that the tool assembly procedure is as follows. The lower nut 23 is threaded onto the mandrel 20. The lower modified casing hanger 30 is placed over the mandrel and engaged with the shoulder 25. The lower double sealing collar 33 is then positioned as shown and the lower seal 36 is positioned. Following this, the cylinder head 46 is assembled over the mandrel and the necessary connections between the tubes 58, 57 and 53 are made. Next, the piston head 39 is placed on the assembly followed by the upper modified casing hanger 29 and its seal 36, and finally the upper nut 24 is threaded on the mandrel 20 and tightened to complete the assembly.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A test and isolation tool for sub-sea well equipment comprising a tubular mandrel, retaining elements on opposite end portions of the mandrel, casing hanger bodies surrounding the mandrel inwardly of and between the retaining elements and having outer ends engaging the retaining elements, fluid sealing collars engaged between the mandrel and casing hanger bodies, expandable casing hanger seals on the exteriors of the casing hanger bodies adjacent to exterior sealing lands thereof, corresponding ends of said seals abutting rigid shoulders of said casing hanger bodies to prevent displacement of the seals axially toward th opposite ends of said mandrel, a piston head including multiple circumferentially spaced pistons surrounding said mandrel between the casing hanger bodies and including a skirt engaging the interior end of one casing hanger seal, a coacting axially opposing cylinder head including multiple circumferentially spaced cylinders for said multiple pistons, means for delivering seal energizing pressurized fluid through the bore of said mandrel to all of said cylinders to pressurize them and force said piston and cylinder heads apart axially for energizing said casing hanger seals, said cylinder head having a skirt engaging the interior end of the other casing hanger seal, and means for delivering seal testing pressurized fluid through the bore of the mandrel to the space surrounding the mandrel between said seals, whereby said seals may be placed in engagement with axially spaced internal sealing lands of a used well head housing to test the integrity of such lands.

2. A test and isolation tool for sub-sea well equipment as defined in claim 1, wherein said tubular mandrel is externally threaded on opposite end portions and said retaining elements are a pair of nuts adjustably engaging said threaded end portions of said mandrel, and said nuts having axially opposing annular shoulders engaging the outer ends of said casing hanger bodies.

3. A test and isolation tool for sub-sea well equipment as defined in claim 1, and said casing hanger bodies comprising salvaged previously used conventional casing hangers which have been cut to cleanly remove corresponding end portions thereof to form said casing hanger bodies, and said casing hanger bodies being arranged in axially opposing oppositely extending directions in said tool.

4. A test and isolation tool for sub-sea well equipment as defined in claim 3, and said casing hanger seals comprising previously used seals.

5. A test and isolation tool for sub-sea well equipment as defined in claim 1, and said piston head and cylinder head being annular, said multiple pistons and cylinders being comparatively small in diameter, and said means for delivering seal energizing pressurized fluid to all of said cylinders including a tube common to said cylinders and having a connection with each cylinder near the bottom thereof.

6. A test and isolation tool for sub-sea well equipment as defined in claim 5, and said means for delivering seal energizing pressurized fluid to all of said cylinders further including a flex coil of tubing connected with said common tool and disposed exteriorly of said mandrel in surrounding relation thereto, a pressurized fluid adapter connected in the side wall of said mandrel and extending internally and exteriorly of the mandrel and being connected to said flex coil of tubing exteriorly of the mandrel, and another tube extending within the bore of the mandrel and coupled with the interior end of said pressurized fluid adapter and adapted for coupling with a pressurized fluid source externally of the mandrel bore and beyond one end of the mandrel.

7. A test and isolation tool for sub-sea well equipment as defined in claim 1, and said means for delivering seal testing pressurized fluid through the bore of the mandrel to the space surrounding the mandrel comprising a tube extending within the bore of the mandrel and adapted for coupling with a source of pressurized fluid beyond one end of the mandrel, and a pressurized fluid adapter connected through the side wall of the mandrel and having its interior end coupled to the last-named tube within the bore of the mandrel and having an exterior test fluid discharge end opening exteriorly of the mandrel side wall into said space surrounding the mandrel between said seals.

8. A test and isolation tool for sub-sea well equipment as defined in claim 7, and said pressurized fluid adapter disposed in a radial opening formed through the tubular mandrel, and an O-ring seal on said adapter within said radial opening.

9. A test and isolation tool for sub-sea well equipment as defined in claim 6, and said pressurized fluid adapter disposed in a radial opening formed through the tubular mandrel, and an O-ring seal on said adapter within said radial opening.

10. A test and isolation tool for sub-sea well equipment as defined in claim 1, and said fluid sealing collars being annular rigid collars, and an internal and an external O-ring seal on each said collar respectively engaging and sealing the exterior surface of the mandrel and an interior surface of the adjacent casing hanger body.

11. A test and isolation tool for sub-sea well equipment as defined in claim 1, and the opposite ends of the tubular mandrel being internally screw-threaded, a tool handling and lifting threaded plug engageable within one internally threaded end of the mandrel, and a threaded closure plug adapted for engagement in the other internally threaded end of the mandrel during use of the tool as an isolation tool to enable seal energizing pressure to be delivered directly through the bore of the mandrel from drill pipe coupled with the mandrel.

12. A test and isolation tool for sub-sea well equipment as defined in claim 11, and an additional plugging means for said means for delivering seal testing pressurized fluid through the bore of the mandrel during usage of the tool as an isolation tool.

13. A combination test and isolation tool for sub-sea well equipment comprising a tubular mandrel, an adjustable retaining element on each end of the tubular mandrel, a pair of casing hanger bodies on the mandrel in spaced surrounding relation thereto inwardly of said retaining elements and having outer ends solidly engaging the retaining elements and having inner ends which are spaced apart axially, a pair of sealing collars interposed between the exterior surface of the mandrel and internal surfaces of the casing hanger bodies, a pair of casing hanger seals on and surrounding external sealing lands of the casing hanger bodies, said seals positioned axially on the tool to engage spaced internal sealing lands of a well head housing, a piston head including multiple circumferentially spaced small pistons surrounding the mandrel axially inwardly of one casing hanger seal and engaging such seal, an axially opposing cylinder head including multiple circumferentially spaced cylinders arranged axially inwardly of the other casing hanger seal and engaging the same, means for delievering seal energizing pressurized fluid through the bore of said mandrel to all of said cylinders, and means for delivering seal testing pressurized fluid through the bore of said mandrel and through the mandrel side wall to the exterior of the mandrel between said seals.

14. A combination test and isolation tool for sub-sea well equipment as defined in claim 13, and both said means for delivering pressurized fluid being small diameter tubing means.

15. A combination test and isolation tool for sub-sea well equipment as defined in claim 14, and said small diameter tubing means including a pair of fluid adapters positioned in openings formed through the mandrel side wall and being sealed in said openings in a fluid tight manner.

*16. A test and isolation tool for sub-sea well equipment comprising a tool body portion adapted for insertion into a well head housing having spaced internal surfaces to be tested for leakage, spaced expandable testing seals on the body portion adapted to register with said surfaces, pressure-responsive means on the body portion operable to expand said seals into test sealing engagement with said surfaces, a first pressure fluid delivery means on the body portion delivering fluid to said pressure-responsive means at a pressure somewhat above test pressure and sufficient in magnitude to expand said seals to a degree enabling said surfaces to resist leakage under test pressure, and a second pressure fluid delivery means on the body portion separate from and isolated from the first delivery means and delivering fluid into a chamber of the body portion between said seals and surfaces at said test pressure.*

*17. A test and isolation tool as defined in claim 16, and said pressure-responsive means comprising oppositely axially moving cylinder-piston means on the body portion between said seals and surfaces.*

*18. A test and isolation tool as defined in claim 17, and spaced rigid abutment means on the body portion at the ends of the seals away from the cylinder-piston means and resisting axial compression of the seals by the cylinder-piston means.*

*19. A test and isolation tool as defined in claim 18, and the cylinder-piston means including axially oppositely moving rigid seal compressing elements in opposing relationship to the rigid abutment means.*

*20. A test and isolation tool as defined in claim 19, and the tool body portion comprising a center mandrel around which said seals are disposed in spaced concentric relationship, and adjustable support means for said seals and abutment means on said center mandrel and disposed on opposite sides axially of the cylinder-piston means.*

*21. A test and isolation tool as defined in claim 20, and said support means including seals engaging said mandrel on opposite sides axially of the cylinder-piston means to sealingly isolate said chamber so that the latter may effectively hold said test pressure.*

* * * * *